(No Model.)
G. M. COBB.
SAWING ATTACHMENT FOR SHAPERS.
No. 394,338. Patented Dec. 11, 1888.
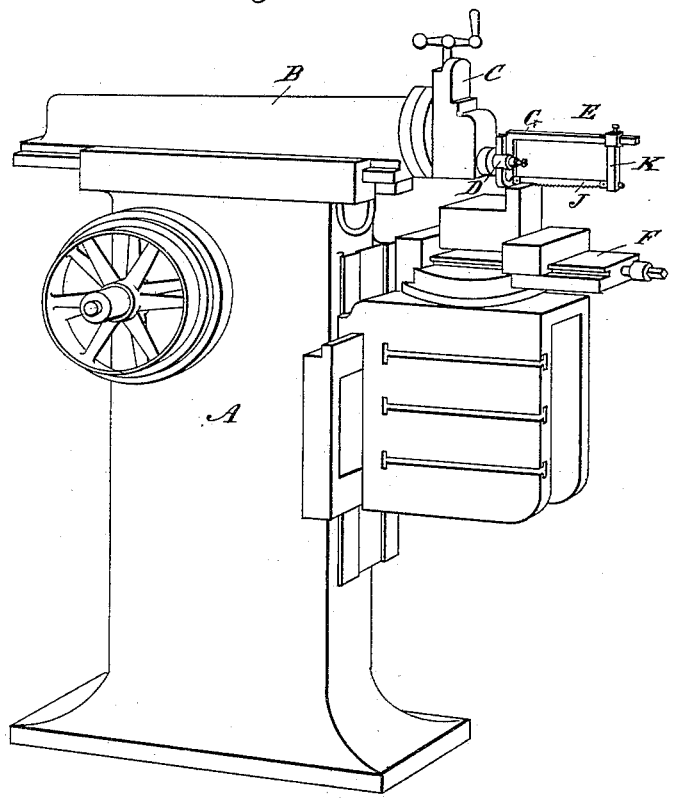
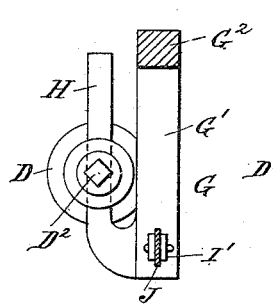
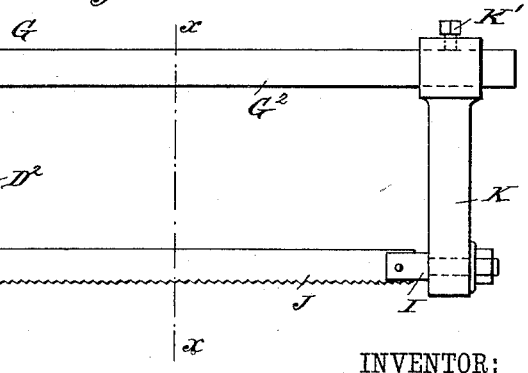
WITNESSES:
D. C. Reusch.
C. Sedgwick.
INVENTOR:
G. M. Cobb
BY Munn &
ATTORNEYS.

UNITED STATES PATENT OFFICE.

GEORGE M. COBB, OF PHILADELPHIA, PENNSYLVANIA.

SAWING ATTACHMENT FOR SHAPERS.

SPECIFICATION forming part of Letters Patent No. 394,338, dated December 11, 1888.

Application filed March 29, 1888. Serial No. 268,769. (No model.)

*To all whom it may concern:*

Be it known that I, GEORGE M. COBB, of Philadelphia, in the county of Philadelphia and State of Pennsylvania, have invented a new and Improved Sawing Attachment for Shapers, of which the following is a full, clear, and exact description.

The object of the invention is to provide a new and improved attachment for shapers or like tools having a reciprocating movement to saw off metallic or other bars, or to form slots, splines, &c.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a perspective view of a shaper provided with the improvement. Fig. 2 is an enlarged side elevation of the same, and Fig. 3 is a sectional end elevation of the same on the line $x\ x$ of Fig. 2.

The shaper A, of any approved construction, is provided with the usual carriage, B, having a reciprocating motion, and provided at its front end with the vertically-adjustable head C, carrying the tool-post D, supporting the attachment E. Below the head C and the attachment E is held the usual adjustable table, F, on which the work to be operated on is held.

The attachment E is provided with the L-shaped bar G, on the vertical arm G' of which is secured the pin H, extending parallel with the arm G', and adapted to pass through the usual slot in the tool-post D, and resting against the collar D' next to the head C. A set-screw, D², screwing into the front end of the post D and against the said pin H, serves to hold the latter and the bar G in place on the said tool-post. On the arm G² of the bar G is held adjustably, by a set-screw, K', the downwardly-extending arm K, provided at its lower end with a clamp, I, to which one end of the saw J, or similar tool, is secured. The other end of the saw J is secured to a clamp, I', held on the arm G'.

The arm K is made adjustable, so as to accommodate saws J of different lengths, according to the work to be performed.

The operation is as follows: The attachment E is secured to the tool-post D, as above described, and the work to be operated on is clamped or otherwise secured on the table F of the shaper A. The carriage B may now be reciprocated, and with it the attachment E and tool carried thereby. The saw J of the attachment E is thus moved over the work to be cut, and when the operator now causes the head C to slide gradually downward, then the saw J will cut into the work to any desired depth to form a slot, or the saw may cut entirely through the work to make two parts. Thus it will be seen that with the attachment pieces can be easily sawed off from metallic bars, blocks, &c., slots can be formed, or by changing the tool J splines may be formed in the hubs of wheels or other articles.

It is understood that the attachment can also be adapted to various other machines having a reciprocating movement.

Having thus fully described my invention, I claim as new and desire to secure by Letters Patent—

1. The combination, with the tool-carrying frame E, of an attaching pin or arm, H, at the rear end thereof and parallel with said end, substantially as set forth.

2. The combination, with the L-shaped bar G, having an attaching-pin, H, on one side of its vertical arm and a tool-clamp at the lower end of the inner side thereof, of the adjustable arm K on the long arm of bar G, and having a tool-clamp on the inner side of its lower end, substantially as set forth, 3. The combination, with a reciprocating carrier, a head held adjustably on the said carrier, and a tool-post fastened on the said head, of a pin adapted to be secured to the said tool-post, an L-shaped bar on which the said pin is secured, an arm held adjustably on the said U-shaped bar, and a saw or similar tool secured to the said U-shaped bar and the said arm, substantially as shown and described.

GEORGE M. COBB.

Witnesses:
WM. S. COBB,
A. JONES.